Dec. 25, 1951     R. J. BERGEMANN, JR     2,579,464
STANDING WAVE RECORDER

Filed June 18, 1946     3 Sheets-Sheet 1

INVENTOR
ROBERT J. BERGEMANN, JR.

BY

ATTORNEY

Dec. 25, 1951   R. J. BERGEMANN, JR   2,579,464
STANDING WAVE RECORDER
Filed June 18, 1946   3 Sheets-Sheet 2

INVENTOR
ROBERT J. BERGEMANN, JR.

BY M. O. Hayes
ATTORNEY

Dec. 25, 1951  R. J. BERGEMANN, JR  2,579,464
STANDING WAVE RECORDER
Filed June 18, 1946  3 Sheets-Sheet 3

INVENTOR
ROBERT J. BERGEMANN, JR.
BY M. O. Hayes
ATTORNEY

Patented Dec. 25, 1951

2,579,464

UNITED STATES PATENT OFFICE 2,579,464

STANDING WAVE RECORDER

Robert John Bergemann, Jr., United States Navy, Boston, Mass.

Application June 18, 1946, Serial No. 677,474

19 Claims. (Cl. 346—33)

(Granted under the act of March 3, 1883, as amended April 30, 1928; 370 O. G. 757)

This invention relates to electronic test equipment, and more particularly to apparatus for measuring and plotting the voltage distribution along a transmission line.

In research and production testing on R.-F. components it is desirable that standing wave ratios and impedance measurements be made with ease and accuracy. Usual methods require that a probe be moved manually in a slotted line to obtain the necessary data on the voltage distribution along the transmission line. From such data impedance is calculated and plots of standing wave ratio versus frequency are made. Such methods are time consuming and are subject to certain inaccuracies which become particularly objectionable when low standing wave ratios are being measured.

It is, therefore, the object of the present invention to provide apparatus for accurately measuring the voltage distribution along a transmission line.

Another object is to provide apparatus for quickly and accurately determining standing wave ratio.

A further object is to provide apparatus for plotting standing wave ratio versus frequency.

It is a still further object to provide apparatus for accurately determining the position of maximum and minimum voltage points along a transmission line.

It is a still further object to provide apparatus for automatically plotting two variables.

These and other objects will be more apparent upon consideration of the following specification, taken in connection with the accompanying drawings, forming a part thereof, in which.

Figure 1:
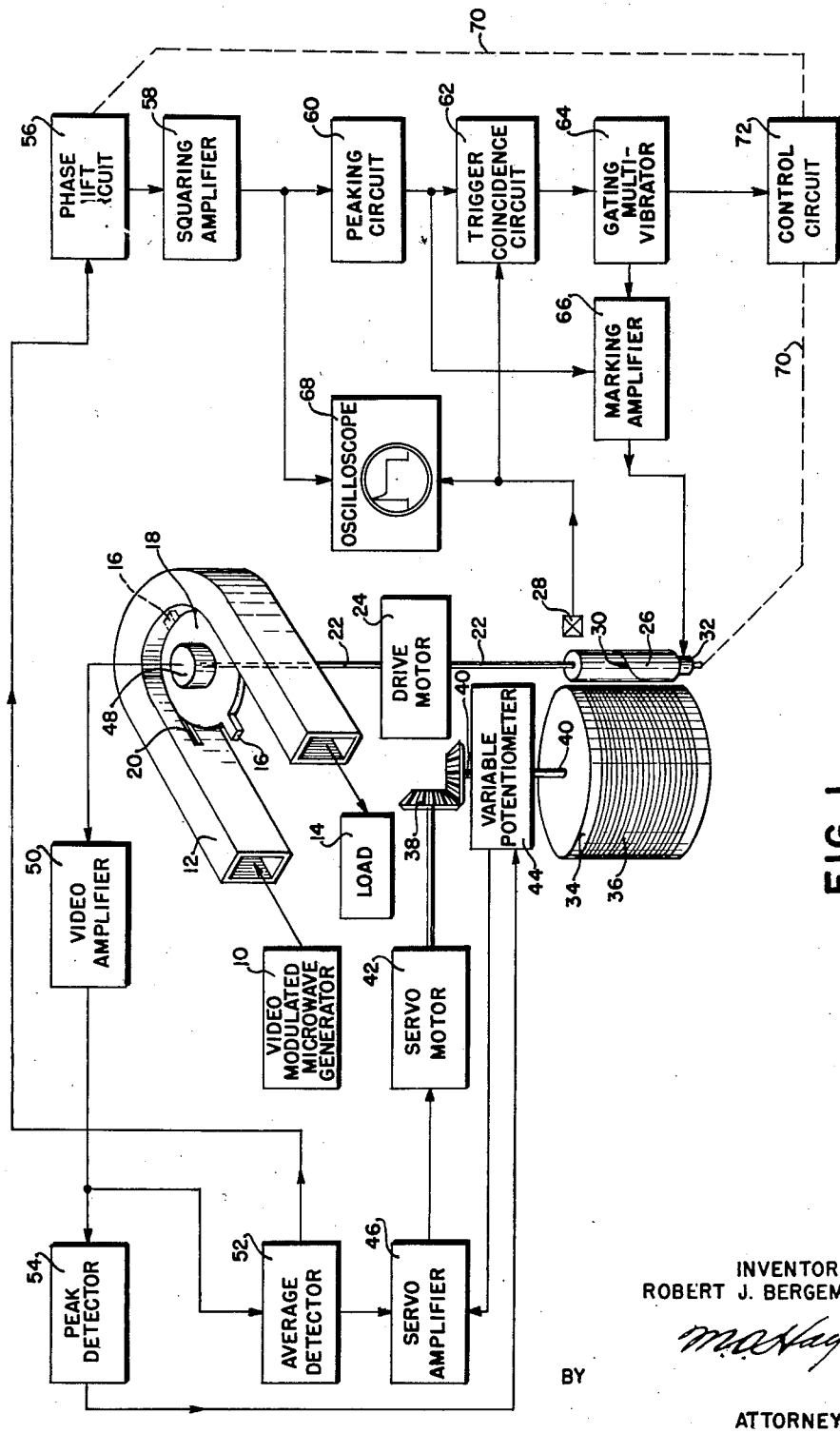
Fig. 1 is a block diagram of one embodiment of the invention.

Referring to Fig. 1, U-shaped transmission line 12 connects a video modulated microwave generator 10 to the R.-F. component under test, herein designated as load 14. Rotating disk 18 keeps one of probes 16, 16 always traversing slot 20 in transmission line 12. The output of the probes is detected at 48, amplified at 50, and applied to peak detector 54 and average detector 52. Servo amplifier 46 and servometer 42, driving variable potentiometer 44, operate to balance the output of peak detector 54 against average detector 52. Accordingly, the angular position of potentiometer 44 is a function of standing wave ratio. Coupled to potentiometer 44 is drum 34, carrying recording paper 36. The rotation of drum 34 provides a convenient means for plotting standing wave ratio along the X-axis of the recording paper.

The output of average detector 52 is limited, producing a rectangular wave. This rectangular wave is peaked, the distance between the resulting pips indicating the wavelength in the line. By synchronizing a given pip with the rotational position of drum 26, and causing the succeeding pip to mark the recording paper 36 at a distance along the Y-axis proportional to the wavelength, a plot of standing wave ratio versus frequency is obtained.

More specifically, video modulated microwave generator 10 may be any microwave generator capable of being amplitude modulated by a video signal, i. e. a 20 kc. sine wave. Its signal output is connected by U-shaped wave guide 12 to the electronic device under test, designated herein as load 14. Probes 16, 16, mounted at diametrically opposite points on the periphery of a disk 18, are rotated by drive motor 24 so that one probe is always traversing slot 20 in wave guide 12. It is obvious that by properly changing the configuration of wave guide 12 any desired plurality of probes may be mounted on disk 18.

Figure 2:
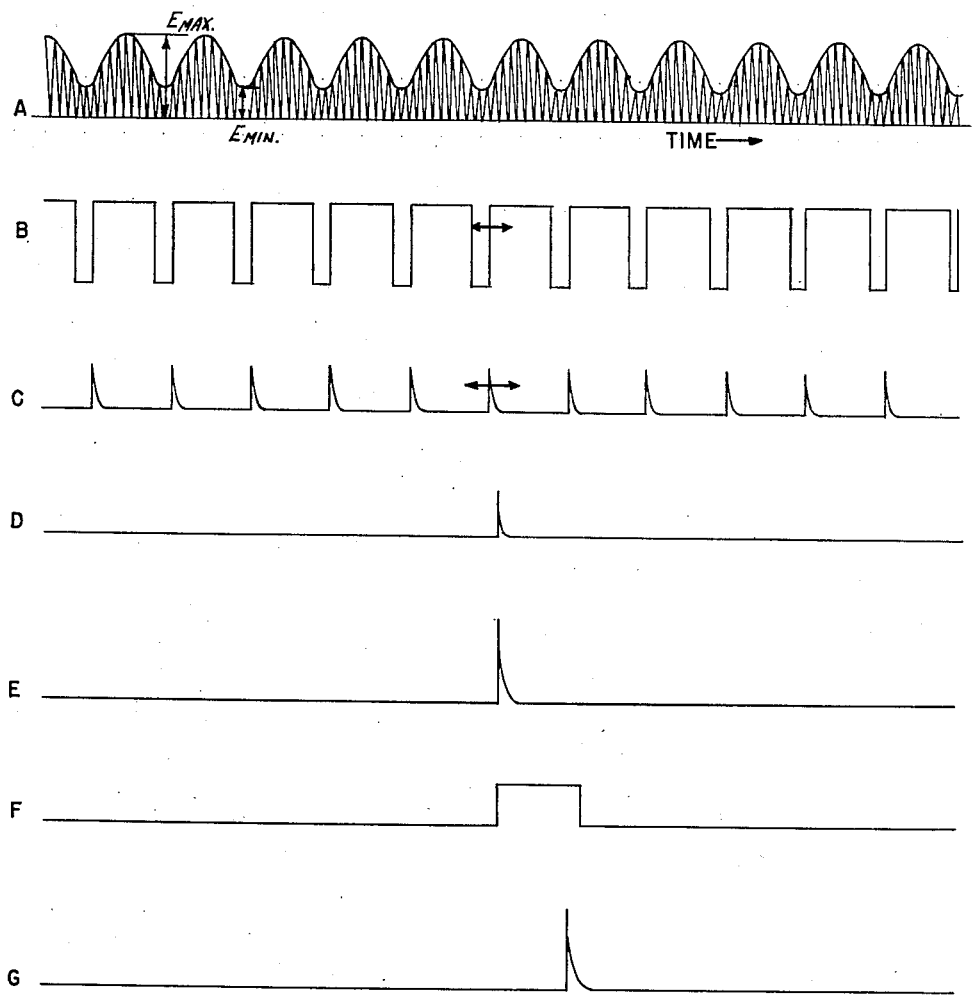
Fig. 2 is a representation of voltage waveforms taken at pertinent points in the circuit of Fig. 1.

Probes 16, 16 are connected to a detector 48, i. e. crystal or bolometer type, which is also mounted on disk 18. The output of detector 48, as shown at A of Fig. 2, is the video modulation of the microwave generator (20 kc. sine wave) modulated by the standing wave configuration along the slot in wave guide 12. The frequency of this latter modulation, caused by the standing waves, is therefore proportional to the wavelength in the transmission line.

The modulated video signal at the output of detector 48 is applied to video amplifier 50, and the amplified signal is then rectified by peak detector 54 and average detector 52. Variable potentiometer 44, as connected across the output of peak detector 54, is positioned by servo amplifier 46, servomotor 42 and gear train 38 so that there is a balance between the outputs of the peak and average detectors. Accordingly, the angular position of variable potentiometer 44, as determined by the maximum and average voltages along transmission line 12, is in known relationship to the standing wave ratio, which is a function of the maximum and minimum voltages along that line. Servomotor 42 also drives recording drum 34, which is longitudinally mounted on the same shaft 40 as variable potentiometer 44, and so assumes the same angular position as does the potentiometer. Teledeltos recording paper 36, fixed to the surface of recording drum 34, is thus moved angularly producing displacement along the X-axis from its reference position by an amount proportional to the standing wave ratio in wave guide 12.

Figure 3:
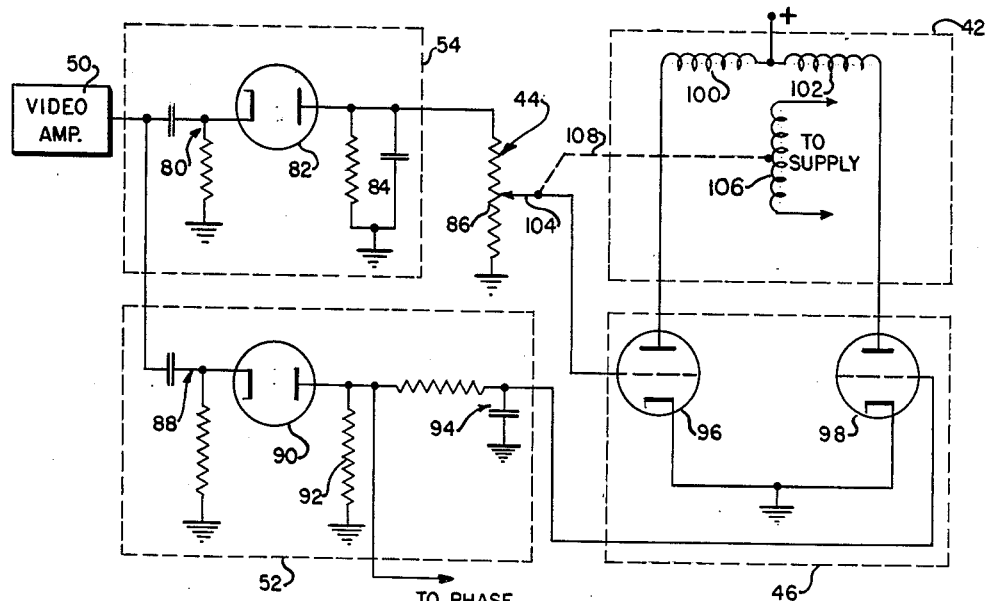
Fig. 3 is a schematic diagram of a portion of the circuit of Fig. 1.

The manner in which servo amplifier 46 and servomotor 42 operate to balance the output of detector 54 against the output of detector 52 is more fully illustrated in Fig. 3. In Fig. 3 the dashed lines are used to enclose the circuits that are included in correspondingly numbered blocks in Fig. 1. The signal from video amplifier 50 is applied through a coupling network 80 to a rectifier tube 82 in detector 54. The detector load is illustrated at 84. Load 84 comprises a shunt combination of resistance and capacitance. The signal which appears across load 84 is applied across the winding 86 of potentiometer 44.

The signal from video amplifier 50 is also applied through a coupling network 88 to a rectifier tube 90 in detector 52. The load for detector 52 is resistor 92. The signal appearing across resistor 92 is applied to a low pass filter 94.

Servo amplifier 46 comprises two vacuum tubes 96 and 98 having as anode loads the differential field coils 100 and 102, respectively, of servomotor 42. The control grid of tube 96 is electrically connected to tap 104 on potentiometer 44, while the control grid of tube 98 is connected to the output of filter 94. The armature winding 106 of motor 42 is energized from some constant source of electrical energy. The armature of motor 42 is mechanically coupled to the movable tap 104 on potentiometer 44 as represented by the broken line 108.

The construction of motor 42 is such that the armature will rotate in one direction if the current in coil 100 is greater than the current in coil 102 and rotate in the opposite direction if the current in coil 102 is greater than the current in coil 100. If the currents in coils 100 and 102 are equal, the armature will remain stationary. Coupling 108 may contain suitable gearing for moving tap 104 along winding 86 in a direction determined by the direction of rotation of motor 42.

If standing waves are present in transmission line 12, the output of detector 54 will be greater than the output of detector 52. Assuming that tap 104 is in a position such that the full signal appearing across winding 86 is applied to the control grid of tube 96, it will be apparent that the current through tube 98 is greater than the current through tube 96. This condition will cause motor 42 to rotate in such a direction that tap 104 is moved along winding 86 until the signals on grids of tubes 96 and 98 are equal. When this condition is reached, the motor 42 will cease to rotate.

Now, let K equal the ratio of the magnitude of the signal on tap 104 to the magnitude of the total signal across winding 86. Obviously, the value of K depends solely upon the position of tap 104. The condition of balance now may be expressed as (1) $$E_A = K E_p$$

where, $E_A$ is the output of the average detector 52 and $E_p$ is the output of the peak detector 54.

If the standing waves are sinusoidal in form (2) $E_p$ equals $E_{max}$ in Fig. 2A (3) $E_A$ equals $\dfrac{E_{max} + E_{min}}{2}$ in Fig. 2A Substituting Equations 2 and 3 in Equation 1, (4) $$\frac{E_{max} + E_{min}}{2} = K E_{max}$$

This equation may be rewritten as (5) $$\frac{1}{2K - 1} = \frac{E_{max}}{E_{min}}$$

But by definition (6) $$P = \frac{E_{max}}{E_{min}}$$

where P is the standing wave ratio.

Substituting Equation 6 in Equation 5

(7) $$P = \frac{1}{2K - 1}$$

Equation 7 indicates that the position of tap 104 at balance is indicative of the standing wave ratio in transmission line 12. It should be noted that the value of K changes rapidly for values of standing wave ratios near unity and changes more slowly as the value of P increases. As will appear presently, this provides an expanded scale for low standing wave ratios. A drum 34, carrying a recording paper 36 is coupled to potentiometer 44.

Average detector 52 also feeds into a frequency measuring circuit comprised of phase shift circuit 56, squaring amplifier 58, peaking circuit 60, trigger coincidence circuit 62, gating multivibrator 64, marking amplifier 66, oscilloscope 68, and drums 26 and 34. The signal that is applied to the frequency measuring circuit is the signal appearing across load resistor 92 of Fig. 3. The modulation envelope of voltage waveform A of Fig. 2, as appearing at the output of average detector 52, is applied to squaring amplifier 58 through phase shift circuit 56. Spiral wire 30 is electrically connected to commutator 32. Trigger contact 28 may be any type of switching means that will provide a momentary contact for each revolution of marking drum 26. The electrical connections to trigger contact 28 will be described in greater detail in connection with Fig. 4. For reasons that will appear presently, drum 34 has a conducting surface which is maintained at ground potential. The wave form is squared up as shown at B of Fig. 2, and then applied to peaking circuit 60 where it is differentiated to produce the positive pulses shown at C of Fig. 2. The arrows on waveforms B and C indicate that these voltages may be shifted in phase by phase shift circuit 56. The triggers at the output of peaking circuit 60 are applied to trigger coincidence circuit 62.

Marking drum 26, provided with a spiral wire 30, a trigger contact 28, and a commutator 32, is mounted longitudinally on shaft 22, adjacent to recording drum 34. As drive motor 24 rotates marking drum 26 a trigger pulse is developed by trigger contact 28 exactly as the end of spiral wire 30 passes recording drum 34 during each revolution. This trigger pulse, as shown at D of Fig. 2, is also applied to trigger coincidence circuit 62. No output is obtained from this coincidence circuit unless the trigger pulse from contact 28 and one of the triggers from peaking circuit 60 are coincident in time. This is brought about by adjusting phase shift circuit 56. Both the output of peaking circuit 60 and of trigger contact 28 are applied to oscilloscope 68, which can be used as an aid in adjusting the phase to effect coincidence. With coincidence, an output is obtained as shown at E of Fig. 2. This output fires gating multivibrator 64, which produces a gate as shown at F of Fig. 2. When this gate is applied to marking amplifier 66 it permits the pulse (from peaking circuit 60) following the one which coincided with the trigger from contact 28 to be amplified. This amplified pulse, as shown at G of Fig. 2, is applied to spiral wire 30 and thereupon marks Teledeltos recording paper 36 at a distance from its bottom which is proportional to the frequency of microwave generator 10. In this manner, recording paper 36 is marked at a point which on its X-axis is a function of standing wave ratio and on its Y-axis is a function of frequency.

For ease of explanation, the system has been described as producing a mark on recording paper 36 which is indicative of the standing wave ratio at a single frequency. The system as described above can, however, readily be adapted for continuously plotting standing wave ratio versus frequency. Phase shift circuit 56, which may include a phase shifting condenser, is continuously varied by coupling to drive motor 24 as indicated by broken line 70. This coupling is momentarily broken with coincidence of a trigger from peaking circuit 60 and trigger contact 28, thereby allowing the standing wave ratio to be marked at the frequency involved. A relay in the plate circuit of gating multivibrator 64, herein termed control circuit 72, is used to control the action of the phase shifting circuit 56 and break the coupling with coincidence for a time sufficiently long to allow a mark to be made. Thus, it is only necessary to change the carrier frequency of microwave generator 10, the marking circuit automatically tracking the frequency and plotting the resulting data.

Figure 4:
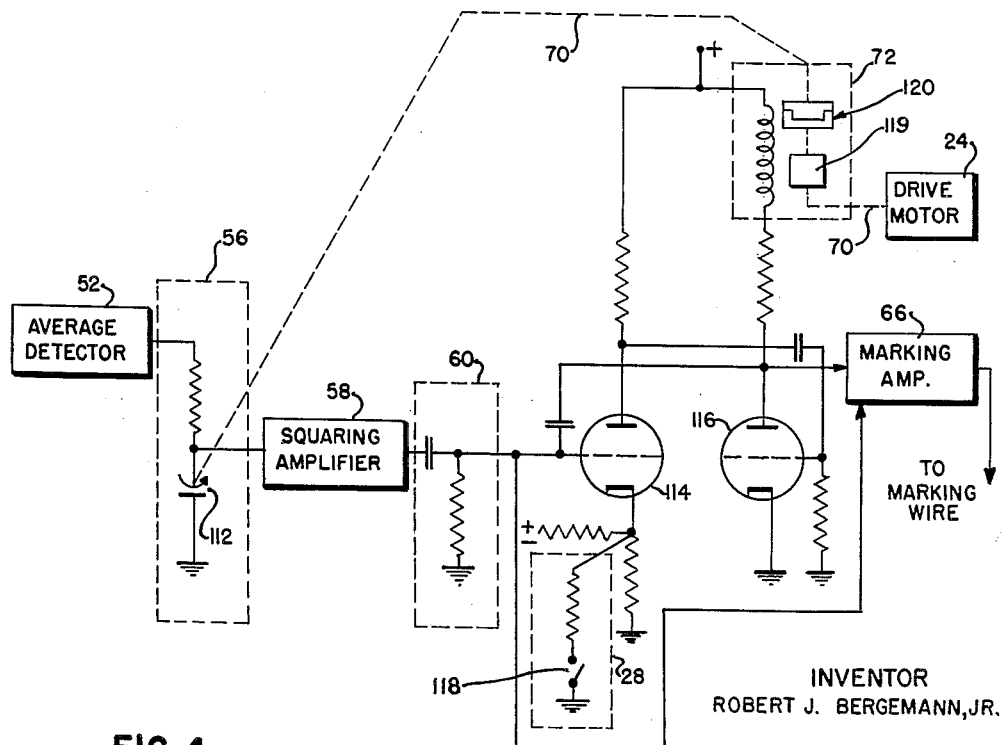
Fig. 4 is a schematic diagram of a second portion of the circuit of Fig. 1.

The circuit for controlling phase shifting circuit 56 and marking amplifier 66 is more fully illustrated in Fig. 4.

The signal from average detector 52 is applied to the series resistor and capacitor combination that forms phase shifter 56. Capacitor 112 in phase shifter 56 is preferably of the type in which the capacitance is a function of shaft rotation. The signal across capacitor 112 is applied through squaring amplifier 58 to a short time constant resistor capacitor circuit that forms peaking circuit 60.

Electron tubes 114 and 116 and associated circuit elements form an unistable multivibrator. This multivibrator circuit corresponds to gating multivibrator 64 of Fig. 1. Normally, tube 114 is maintained in a non-conducting state by a positive bias on the cathode. When switch 118 in trigger generator 28 is closed, the bias on tube 114 is reduced. As was stated above, switch 118 is closed only momentarily. If a positive signal is applied to the grid of tube 114 during the interval that the bias on the cathode is reduced, tube 114 will conduct. Conduction will continue in tube 114 for a period determined by the constants of the multivibrator circuit.

Tube 116 is normally conducting but is cut off during the period that tube 114 is conducting.

Control circuit 72 of Fig. 1 may include a reduction gearing 119 and a magnetic clutch 120. Drive motor 24 is coupled directly to reduction gearing 119 while gearing 119 is coupled to capacitor 112 through the plates of clutch 120. The coil of clutch 120 is connected in the anode circuit of tube 116. When the coil of clutch 120 is energized, motor 24 will rotate capacitor 112. However, when the coil of clutch 120 is not energized, capacitor 112 will remain stationary.

The signal appearing at the anode of tube 116 is applied as a gating signal to marking amplifier 66.

In operation, motor 24 will drive capacitor 112 until the proper coincidence between the signal from trigger generator 28 and the signal from peaking circuit 60 is obtained. When coincidence occurs, tube 114 will conduct and tube 116 will be cut off causing the plates of clutch 120 to release. Marking amplifier 66 then causes a signal to make a mark on paper 36. If there is a lag in the operation of clutch 120, several marks may be made before coincidence is lost. However, assuming no lag, after a mark is made, tube 116 will again conduct causing clutch 120 to engage and again rotate capacitor 112. When coincidence is again reached, the marking process will be repeated. If the time required for phase shift circuit to go through one complete circuit is small compared to the period required for generator 10 to sweep through the desired band of frequencies, the individual points marked on paper 36 will merge into a continuous plot of standing wave ratio against frequency.

The apparatus may be readily adapated to making impedance measurements by making trigger contact 28 adjustable in position about drum 26, and providing a calibrated scale. The location of the minimum voltage points, as indicated at C of Fig. 2, may then be tracked with the trigger from contact 28 and the desired data obtained.

It should be noted that the above described invention incorporates a system for plotting two variables automatically. The quantities plotted need not be limited to the ones used herein.

The invention described in the foregoing specifications need not be limited to the details shown. It will be obvious to one skilled in the art that many changes may be made in the circuits disclosed without departing from the spirit of the invention, as sought to be defined in the following claims.

The invention described herein may be manufactured and used by or for the Government of the United States of America for governmental purposes without the payment of any royalty thereon or therefor.

What is claimed is:

1. Electronic test equipment comprising, a signal generator, a slotted transmission line, means for connecting a component to be tested to said signal generator through said transmission line, a probe, means for continuously moving said probe along said slotted transmission line, a peak detector and an average detector, said probe output being connected to both said detectors, means for comparing the output of said detectors, and means operatively associated with said signal generator for plotting the result of said comparison versus the signal generator frequency.

2. An apparatus for plotting standing wave ratio versus frequency in an electromagnetic energy transmission system comprising, an amplitude modulated signal generator, a slotted wave guide serially connected in said transmission system, a first detector, means for coupling energy from said slotted wave guide to said first detector including a disk having a plurality of probes mounted on its periphery, a drive motor adapted to rotate said disk so as to cause said probes to sweep continuously through said slotted wave guide, a peak detector and an average detector receiving the output of said first detector, a potentiometer receiving the output of said peak detector, a servo mechanism receiving the output of said average detector and a signal from a tap on said potentiometer, said servomechanism being adapted to position said tap on said potentiometer so as to balance said signal and the output of said average detector, a recording drum, said recording drum being angularly displaced from a reference position by said servomechanism as a function of the position of said potentiometer, a marking drum provided with a spiral wire, a commutator and a trigger contact, said marking drum being rotated by said drive motor in proximity to said recording drum, and a frequency measuring circuit including a phase shift circuit receiving the output of said average detector, a squaring amplifier connected to said phase shift circuit, a peaking circuit connected to said squaring amplifier, a trigger coincidence circuit receiving the output of said peaking circuit and a trigger from said trigger contact, a gating multivibrator fired by coincidence in said trigger coincidence circuit, a marking amplifier receiving the output of said peaking circuit and turned on by said gating multivibrator, whereby the output of said marking amplifier is applied to said spiral wire through said commutator whereby said apparatus is adapted to mark a sheet of electrosensitive paper secured to the surface of said recording drum along its Y-axis at a point representative of the frequency of said signal generator, the marking position along the X-axis being determined by the angular displacement of said recording drum.

3. Electronic test equipment comprising first means for producing a first signal that varies as a function of the voltage distribution along a transmission line, second means coupled to said first means and adapted to produce a second signal which is proportional to the peak value of said first signal, third means coupled to said first means and adapted to produce a third signal which is proportional to the average value of said first signal, a potentiometer coupled to the output of said second means, a servomechanism electrically coupled to a movable tap on said potentiometer and to said third means, said servomechanism being adapted to move said tap to a position on said potentiometer at which the signal on said tap will correspond to said third signal, a recording drum operatively connected to said servomechanism and adapted to be rotated thereby, means for measuring the frequency of the signal in the transmission line, a marking element disposed in a predetermined space relationship to said recording drum and means associated with said measuring means for positioning said marking element in accordance with the frequency measured.

4. An apparatus for plotting standing wave ratio versus frequency in a transmission system comprising, means for producing a voltage that varies as a function of the voltage distribution along said transmission system, a peak detector, an average detector, both of said detectors being coupled to said voltage producing means, a recording element, means for displacing said recording element by an amount proportional to the ratio of the outputs of said peak and average detectors, means for measuring the frequency of the signal in said transmission system, a marking element disposed in spaced relationship to said recording element and adapted to be positioned in accordance with the output of said frequency measuring means, and means for applying a marking signal to said marking element whereby said apparatus is adapted to record standing wave ratio versus frequency on said recording element.

5. Means for measuring the frequency of a signal in an electromagnetic transmission system including a section of wave guide comprising a signal pickup, means for moving said signal pickup along said wave guide at a predetermined rate, means for detecting the modulation envelope of the signal received by said signal pickup and means for measuring the time duration of a cycle of said modulation signal.

6. A frequency measuring means as in claim 5 wherein said means for measuring the time duration of a cycle of said modulation signal includes a recording means.

7. Apparatus for measuring the standing wave ratio of a signal in an electromagnetic transmission system comprising means for measuring maximum amplitude of the signal occurring in a predetermined region of said transmission system, means for measuring the average amplitude of the signal within said region and means for comparing the amplitude of said two measured signals.

8. Apparatus for measuring the standing wave ratio of a signal in an electromagnetic transmission system, comprising means for measuring the maximum amplitude of signal in said transmission system, means for measuring the average amplitude of signal in said transmission system, a signal ratio device coupled to said means for measuring the maximum amplitude of signal, and means for adjusting the output of said signal ratio device to a value equal to the output of said means for measuring average amplitude whereby the setting of said signal ratio device is indicative of the standing wave ratio in said transmission system.

9. An apparatus for plotting standing wave ratio versus frequency in an electromagnetic transmission system comprising, an amplitude modulated signal generator coupled to said transmission system, a slotted wave guide serially connected in said transmission system, a first detector, means for coupling energy from said slotted wave guide to said first detector, said means including a plurality of probes, means for causing said probes to sweep continually through said slotted wave guide, a peak detector and an average detector receiving the output of said first detector, a potentiometer receiving the output of said peak detector, a servomechanism receiving the output of said average detector and a signal from a tap on said potentiometer, said servomechanism being adapted to position said tap on said potentiometer so as to balance said signal from said tap and the output of said average detector, a recording drum, said recording drum being angularly displaced from a reference position by said servomechanism by an amount that is a function of the position of said tap on said potentiometer, a marking drum provided with a spiral wire, a commutator and a trigger contact, said trigger contact being adapted to provide a short pulse signal for each revolution of said marking drum, said marking drum being adapted to be rotated in proximity with said recording drum, a phase shifting circuit receiving a signal from said average detector corresponding to the modulation envelope of signals received from said probe due to the presence of standing waves in said wave guide, said phase shifting circuit being adapted to shift the phase of said modulation signal so as to cause a predetermined portion of a cycle of said modulation signal to occur in time coincidence with the signal from said trigger contacts, and means for causing a pulse signal to be applied to said spiral wire through said commutator at the time said modulation signal next reaches said predetermined portion of the cycle, whereby said apparatus is adapted to record on a sheet of electrosensitive paper secured to said recording device a plot of standing wave ratio against frequency in said transmission line.

10. An apparatus for plotting standing wave ratio versus frequency in an electromagnetic transmission system comprising, an amplitude modulated signal generator coupled to said transmission system, means adapted to vary periodically the frequency of said generator through a predetermined range of frequencies, a slotted wave guide serially connected in said transmission system, a first detector, means for coupling energy from said slotted wave guide to said first detector, said means including a plurality of probes, means for causing said probes to sweep continually through said slotted wave guide, a peak detector and an average detector receiving the output of said first detector, a signal ratio device receiving the output of said peak detector, a servomechanism receiving the output of said average detector and the output of said signal ratio device, said servomechanism being adapted to position said signal ratio device so as to balance the output of said signal and the output of said average detector, a recording drum, said recording drum being angularly displaced from a reference position by said servomechanism by an amount that is a function of the setting of said signal ratio device, a marking drum including a spiral wire, a commutator and a trigger contact, said trigger contact being adapted to provide a short pulse signal for each revolution of said marking drum, said marking drum being adapted to be rotated in proximity with said recording drum, a variable phase shifting circuit receiving a signal from said average detector corresponding to the modulator envelope of signals received from said probes due to the presence of standing waves in said wave guide, said phase shifting circuit adapted to shift the phase of said modulation signal, means for cyclically varying said phase shifting circuit, means for momentarily stopping the variation in said phase shifting circuit at a time when a predetermined portion of a cycle of said modulation signal coincides with the signal from said trigger contact, and means for causing a pulse signal to be applied to said spiral wire through said commutator at the time said modulation signal next reaches said predetermined portion of the cycle whereby said apparatus is adapted to record on a sheet of electrosensitive paper secured to said recording drum a continuous plot of standing wave ratio in said transmission line against frequency.

11. Electronic test equipment comprising first means for producing a first signal that varies as a function of the voltage distribution along a transmission line, a second means coupled to said first means and adapted to produce a second signal that is proportional to the peak value of said first signal, third means coupled to said first means and adapted to produce a third signal that is proportional to the average value of said first signal, a controllable signal amplitude changing means coupled to the output of said second means, control means coupled to said signal amplitude changing means and adapted to control the change in amplitude of a signal passing through said signal amplitude changing means, a recording drum operatively connected to said control means and adapted to be rotated thereby, and means for recording the position of said drum.

12. Electronic test equipment comprising first means for producing a first signal that varies as a function of the voltage distribution along a transmission line, second means coupled to said first means and adapted to produce a second signal that is proportional to the peak value of said first signal, third means coupled to said first means and adapted to produce a third signal that is proportional to the average value of said first signal, a controllable signal amplitude changing means coupled to the output of said second means, control means coupled to said signal amplitude changing means and adapted to control the change in amplitude of a signal passing through said signal amplitude changing means, a recording drum operatively connected to said control means and adapted to be rotated thereby, means for measuring the frequency of the signal in the transmission line, a marking element disposed in a predetermined relationship to said recording drum and means associated with said frequency measuring means for positioning said marking element in accordance with the frequency measured, said marking element and said recording drum cooperating to provide a record of the standing waves and frequency of the signal present in said transmission line.

13. Apparatus for plotting the standing wave ratio in a transmission system comprising, means for producing a signal that varies as a function of the voltage distribution along said transmission line, a peak detector and an average detector, both of said detectors being coupled to said voltage producing means, a recording element, means associated with said peak detector and said average detector for displacing said recording element by an amount proportional to the ratio of the outputs of said peak and average detectors, and means for marking the position of said recording element.

14. An apparatus for plotting standing wave ratio versus frequency in a transmission system comprising, means for producing a signal that varies as a function of the voltage distribution along said transmission system, means responsive to said signal and adapted to provide an output proportional to the ratio of the peak amplitude of said signal to the average amplitude of said signal, a recording element, means responsive to said output for displacing said recording element by an amount proportional to said ratio, means for measuring the frequency of the signal in said transmission system, a marking element associated with said recording element and adapted to be positioned in accordance with the output of said frequency measuring means, and means for causing said marking element to form a record on said recording element whereby said apparatus is adapted to record standing wave ratio versus frequency on said recording element.

15. Means for recording the frequency of an electromagnetic signal in a transmission system, comprising a signal pick-up, means for moving said signal pick-up along said transmission system at a predetermined rate, means for detecting the modulation envelope of the signal received by said signal pick-up, a marking element mechanically coupled to said signal pick-up for rotation therewith, means for shifting the phase of said modulation envelope to cause a preselected point of said modulation envelope to occur at the time said marking element is in a preselected position, and means for recording the angular position of said marking element at a time displaced exactly one cycle of said modulation envelope from said preselected point.

16. Means for recording the frequency of an electromagnetic signal in a transmission system comprising, a signal pick-up, means for moving said signal pick-up along said transmission system at a predetermined rate, means for detecting the modulation envelope of the signal received by said signal pick-up, means generating a pulse signal for each cycle of said modulation envelope, an adjustable phase shifter coupling said detecting means to said pulse generating means, each of said pulses occurring at a predetermined point on a cycle of the phase-shifted modulation envelope, a marking element mechanically coupled to said signal pick-up for rotation therewith, means for adjusting said phase shifter to cause one of said pulses to occur at a time when said marking element is in a reference position, means responsive to the pulse following said last-mentioned pulse for recording the position of said marking element at the time said following pulse occurs, the recorded position of said marking element being indicative of the frequency of the signal in said transmission means.

17. Electronic test equipment comprising first means for producing a first signal that varies as a function of the voltage distribution along a transmission line, second means coupled to said first means and adapted to produce a second signal that is proportional to the peak value of said first signal, third means coupled to said first means and adapted to produce a third signal that is proportional to the average value of said first signal, a controllable signal amplitude changing means coupled to one of said second and third means, control means coupled to said signal amplitude changing means and adapted to control said signal amplitude changing means to cause the output of said signal amplitude changing means to bear a predetermined amplitude relationship to the signal from the other of said second and third means, a recording drum operatively connected to said control means and adapted to be rotated thereby by an amount proportional to the setting of said amplitude changing means, means for measuring the frequency of the signal in the transmission line, a marking element disposed in a predetermined relationship to said recording drum and means associated with said frequency measuring means for positioning said marking element in accordance with the frequency measured, said marking element and said recording drum cooperating to provide a record of the standing waves and frequency of the signal present in said transmission line.

18. Apparatus for measuring the standing wave ratio of a signal in an electromagnetic energy transmission system comprising means for measuring the maximum amplitude of signal occurring in a predetermined region in said transmission system, means for measuring the average amplitude of signal in said region of said transmission system, a signal amplitude changing means coupled to the output of one of said two last mentioned means, and means for adjusting the output of said signal amplitude changing means to a value equal to the output of the other of said two last mentioned means, whereby the setting of said signal amplitude changing means is indicative of the standing wave ratio in said transmission system.

19. Means for recording the frequency of an electromagnetic signal in a transmission system comprising, a signal pick-up, means for moving said signal pick-up along said transmission system at a predetermined rate, means for detecting the modulation envelope of the signal received by said signal pick-up, means for generating a pulse signal for each cycle of said modulation envelope, an adjustable phase shifter coupling said detecting means to said pulse generating means, each of said pulses occurring at a predetermined point on a cycle of the phase-shifted modulation envelope, a marking element mechanically coupled to said signal pick-up for rotation therewith, means for generating a reference signal when said marking element is in a reference position, indicating means coupled to said reference signal generating means and said pulse signal generating means for indicating the relative times of occurrence of said reference signals and said pulse signals, a coincidence circuit having first and second inputs coupled respectively to said pulse generating means and said reference signal generating means and adapted to produce an output pulse in response to simultaneous signals at said first and second inputs, gate generating means responsive to the output of said coincidence circuit, a gated amplifier responsive to the output of said gate generating means and said pulse generating means and means connecting said gated amplifier to said marking element.

ROBERT JOHN BERGEMANN, Jr.

REFERENCES CITED

The following references are of record in the file of this patent:

UNITED STATES PATENTS

| Number | Name | Date |
|---|---|---|
| 2,032,558 | Finch | Mar. 3, 1936 |
| 2,228,883 | Morgan | Jan. 14, 1941 |
| 2,250,509 | Turner, Jr. | July 29, 1941 |
| 2,304,015 | Peterson et al. | Dec. 1, 1942 |
| 2,400,597 | Peterson | May 21, 1946 |
| 2,404,568 | Dow | July 23, 1946 |
| 2,412,393 | Ghosh | Dec. 10, 1946 |
| 2,412,639 | Trougott | Dec. 17, 1946 |
| 2,454,042 | Dettinger | Nov. 16, 1948 |
| 2,472,785 | Blitz | June 14, 1949 |

OTHER REFERENCES

Article on a "Standing Wave Meter" by Heinz E. Kallmann, Electronics, January 1947, pages 96 to 99.